(12) United States Patent
Maki et al.

(10) Patent No.: US 12,466,121 B2
(45) Date of Patent: Nov. 11, 2025

(54) FINISH OF A PREFORM AND A CONTAINER FORMED FROM THE PREFORM

(71) Applicant: LIQUIFORM GROUP LLC, Saline, MI (US)

(72) Inventors: Kirk Edward Maki, Tecumseh, MI (US); Gregory Carpenter, Ann Arbor, MI (US); Jonathan Mcgurk, Toledo, OH (US); Theodore Tekip, Royal Oak, MI (US)

(73) Assignee: LiquiForm Group LLC, Saline, MI (US)

( * ) Notice: Subject to any disclaimer, the term of this patent is extended or adjusted under 35 U.S.C. 154(b) by 190 days.

(21) Appl. No.: 17/800,510

(22) PCT Filed: Feb. 21, 2020

(86) PCT No.: PCT/US2020/019137
§ 371 (c)(1),
(2) Date: Aug. 17, 2022

(87) PCT Pub. No.: WO2021/167616
PCT Pub. Date: Aug. 26, 2021

(65) Prior Publication Data
US 2023/0087929 A1    Mar. 23, 2023

(51) Int. Cl.
*B29B 11/14*    (2006.01)
*B29C 49/06*    (2006.01)
(Continued)

(52) U.S. Cl.
CPC .............. *B29C 49/06* (2013.01); *B29B 11/14* (2013.01); *B29C 2049/024* (2013.01);
(Continued)

(58) Field of Classification Search
CPC ..... B29C 49/06; B29C 49/0078; B29C 49/12; B29C 2949/20; B29C 2949/0715;
(Continued)

(56) References Cited

U.S. PATENT DOCUMENTS

| 2002/0108924 | A1* | 8/2002 | White | B65D 1/0246 |
| | | | | 215/354 |
| 2003/0136084 | A1 | 7/2003 | Silvers et al. | |
| 2005/0139569 | A1 | 6/2005 | Larsen et al. | |
| 2005/0142311 | A1* | 6/2005 | Nahill | B29C 49/071 |
| | | | | 428/35.7 |
| 2006/0073293 | A1 | 4/2006 | Nahill | |
| 2006/0249477 | A1 | 11/2006 | Simpson, Jr. et al. | |

(Continued)

FOREIGN PATENT DOCUMENTS

| EP | 2100707 A1 | 9/2009 |
| JP | 4103224 B2 | 6/2008 |
| WO | 2014/028998 A1 | 2/2014 |

*Primary Examiner* — Alison L Hindenlang
*Assistant Examiner* — Debjani Roy
(74) *Attorney, Agent, or Firm* — Honigman LLP; Eric J. Sosenko; Jonathan P. O'Brien

(57) ABSTRACT

A finish of a preform and a container formed from the preform. The finish has a brim defining an opening of the finish. The brim is configured to provide a sealing surface with a forming and filling head for forming the container from the preform and filling the container with a product. A support flange extends from an outer side surface of the finish. The support flange includes an undersurface having an inner portion that is directly opposite to the brim. The inner portion of the undersurface of the support flange is closer to an axial center of the finish than an innermost portion of the outer side surface.

17 Claims, 4 Drawing Sheets

(51) Int. Cl.
B29C 49/02 (2006.01)
B29L 31/00 (2006.01)

(52) U.S. Cl.
CPC ............... *B29C 2949/0715* (2022.05); *B29C 2949/0769* (2022.05); *B29C 2949/0778* (2022.05); *B29C 2949/0821* (2022.05); *B29C 2949/0822* (2022.05); *B29L 2031/7158* (2013.01)

(58) Field of Classification Search
CPC .... B29C 2949/0769; B29C 2949/0778; B29C 2949/0821; B29C 2949/0825; B29C 2949/0826; B29C 2949/071; B29D 22/003
See application file for complete search history.

(56) References Cited

U.S. PATENT DOCUMENTS

| | | |
|---|---|---|
| 2009/0188888 A1 | 7/2009 | Penny |
| 2009/0223920 A1* | 9/2009 | Patel ................... B29C 49/80 215/45 |
| 2010/0270255 A1* | 10/2010 | Penny .................. B29B 11/14 215/44 |
| 2013/0330490 A1 | 12/2013 | Calello |
| 2015/0140245 A1* | 5/2015 | Haury ................ A61M 5/3129 428/36.6 |
| 2015/0191269 A1 | 7/2015 | Siegl |
| 2016/0107367 A1* | 4/2016 | Maki ................... B29C 49/12 425/524 |
| 2016/0136864 A1* | 5/2016 | Miyawaki .......... B65D 23/0864 264/516 |

* cited by examiner

FINISH OF A PREFORM AND A CONTAINER FORMED FROM THE PREFORM

FIELD

The present disclosure relates to a finish of a preform and a container formed from the preform.

BACKGROUND

This section provides background information related to the present disclosure, which is not necessarily prior art.

Polymeric containers are used to store various types of liquid food and beverages. Such containers are typically formed from a preform using various processes. One such process involves simultaneously forming the container from a preform and filling the container with any suitable product. This process is commonly referred to as Liquiform®. To simultaneously form and fill the container, a forming/filling head is placed into cooperation with a finish of the preform, and the preform is stretched into a mold of the container in response to the liquid product being injected under pressure into the container.

While existing preforms are suitable for their intended use, issues sometimes arise with preforms having relatively larger finishes, such as 48 mm in diameter, and formed of high-density polyethylene (HDPE), which is less rigid than other materials, such as Polyethylene Terephthalate (PET). With such finishes, a support flange thereof has been observed to deflect into the mold that the preform is stretched and blown into. Deflection of the support flange results in leakage between a sealing surface at a brim of the preform and the forming/filling head during forming and filling. The inability to establish a consistent and lasting seal between the sealing surface at the brim of the finish and the forming/filling head may result in an inability to hold pressure on the container during forming and decreased "definition" in the container post-forming. The present disclosure advantageously includes an improved finish of a preform and a container formed from the preform that overcomes the issues described above, and provides numerous additional advantages and unexpected results as explained herein and as one skilled in the art will appreciate.

SUMMARY

This section provides a general summary of the disclosure, and is not a comprehensive disclosure of its full scope or all of its features.

The present disclosure includes a finish of a preform and a container formed from the preform. The finish has a brim defining an opening of the finish. The brim is configured to provide a sealing surface with a forming and filling head for forming the container from the preform and filling the container with a product. A support flange extends from an outer side surface of the finish. The support flange includes an undersurface having an inner portion that is directly opposite to the brim.

The present disclosure also includes a finish of a preform and a container formed from the preform. The finish has a brim defining an opening of the finish. The brim is configured to provide a sealing surface with a forming and filling head for forming the container from the preform and filling the container with a product. A support flange extends from an outer side surface of the preform. The support flange includes an undersurface and an upper surface opposite to the under surface. The undersurface has a larger radial area than the upper surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
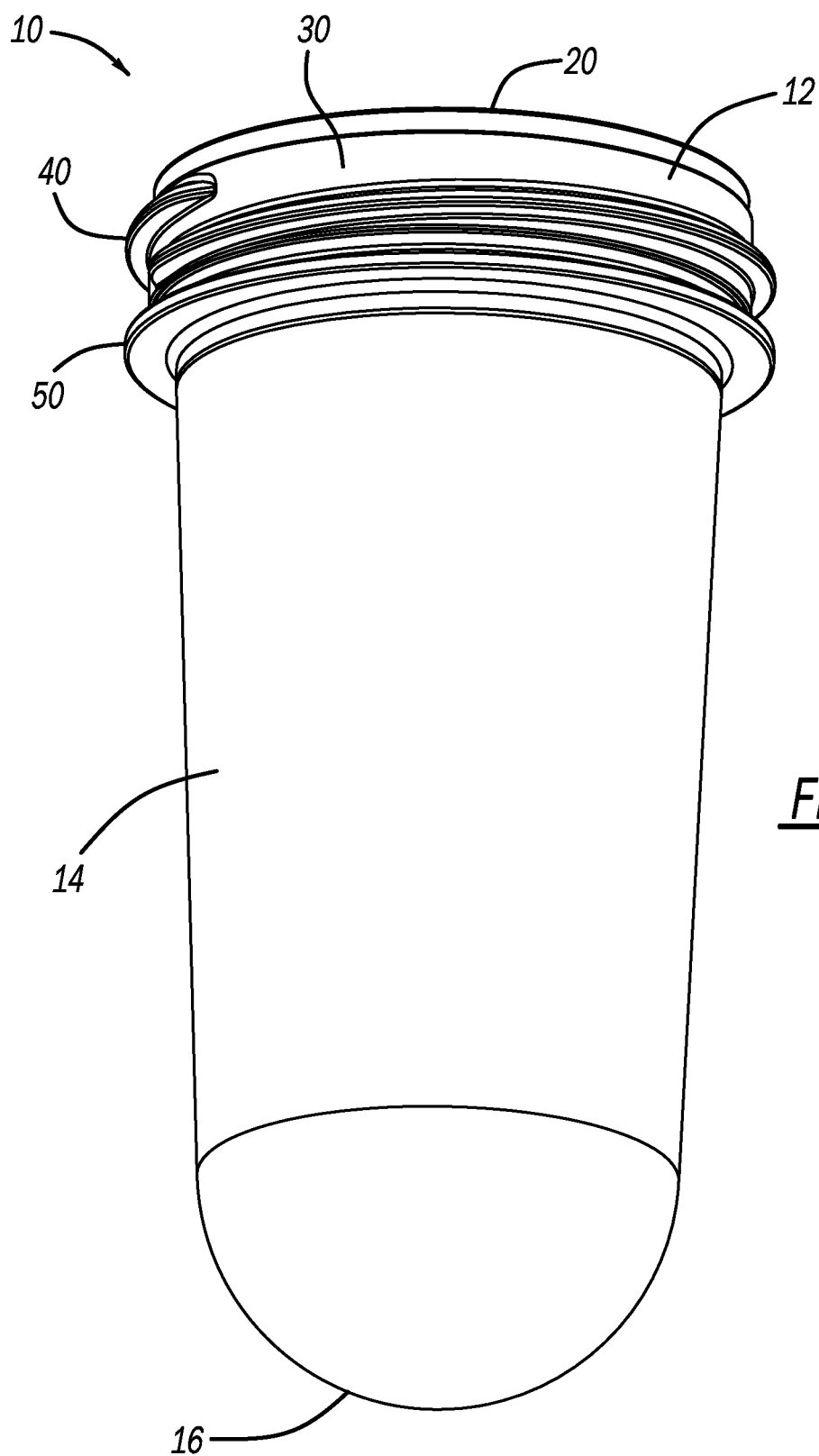
FIG. 1 is a perspective view of a preform in accordance with the present disclosure from which a container can be formed.

FIG. 1 illustrates a preform 10 in accordance with the present disclosure. The preform 10 is configured to be formed into a container for storing any suitable product by way of any suitable forming process. One such process is known as Liquiform®, whereby the preform 10 is simultaneously stretched into a blow mold 110 (see FIG. 3) and filled with any suitable product. Suitable products include, but are not limited to, water, sports drinks, juices, sauces, any suitable foodstuffs, etc. The preform 10 and resulting container may be formed of any suitable polymeric material, such as polyethylene terephthalate, low-density polyethylene, high-density polyethylene, polypropylene, and polystyrene, for example.

The preform 10 generally includes a finish 12, a body 14, and a base 16. The finish 12 remains the same, or substantially the same, throughout the forming and filling process. The body 14 is blown into the blow mold 110 to form a body of the container. The base 16 forms a base of the container.

The finish 12 includes a brim 20, which is an annular brim defining an opening 22 of the finish 12, which is ultimately an opening of the container formed from the preform 10. At the brim 20, the finish 12 may have any suitable diameter, such as 48 mm, about 48 mm or at least 48 mm. The brim 20 provides a sealing surface against which any suitable forming and filling head of a Liquiform® forming and filling machine can seal against. With the forming and filling head sealed to the brim 20, any suitable product can be injected into the preform 10 at high pressure to expand the body 14 and the base 16 into the blow mold 110 to form and fill the container.

The finish 12 includes an outer surface 30. At the outer surface 30 are threads 40. The threads 40 may extend from the outer surface 30 as illustrated, or be recessed within the outer surface 30. The threads 40 are configured to cooperate with any suitable closure for closing the opening 22.

Figure 3:
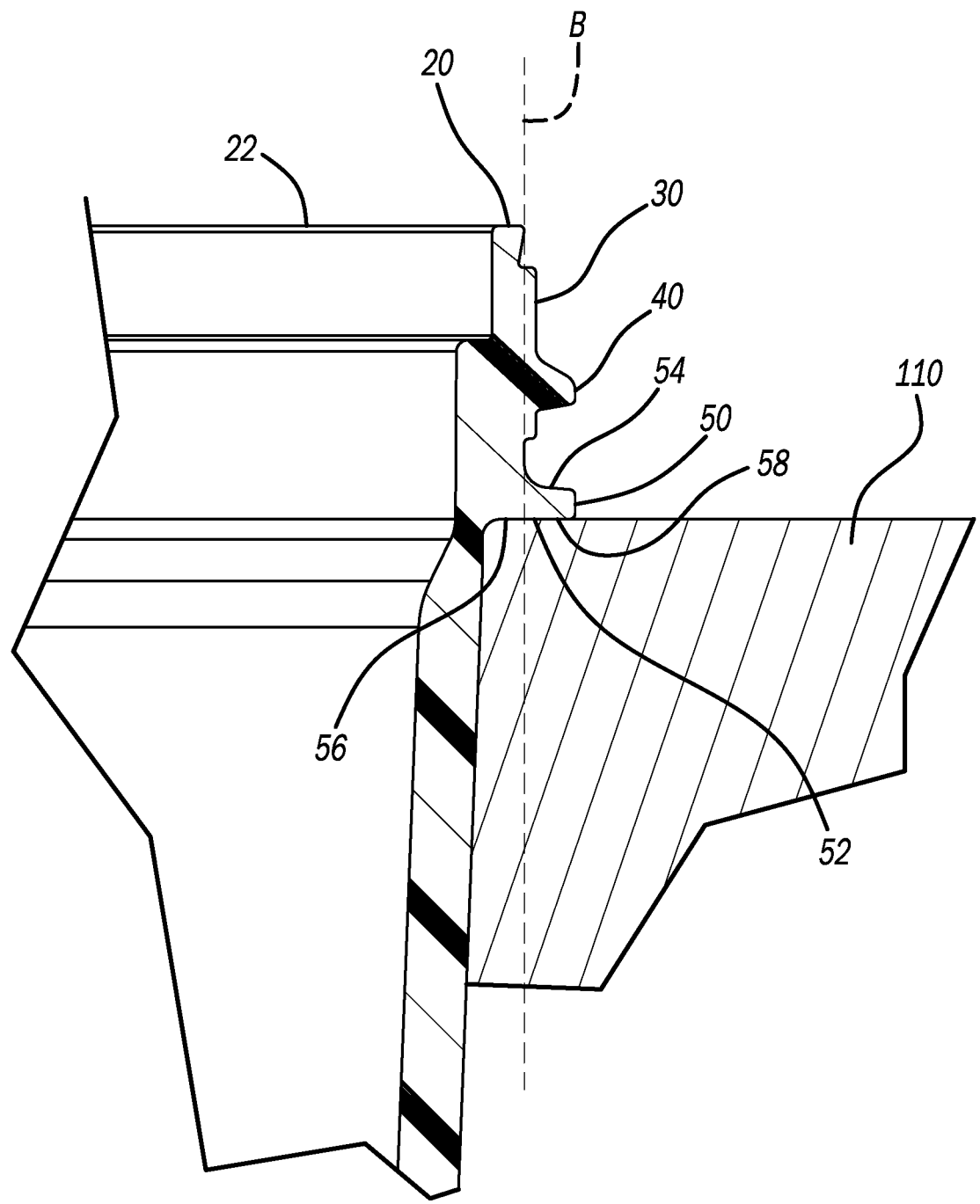
FIG. 3 illustrates cooperation between a support flange of the preform of FIG. 1 and a mold for forming the container from the preform.

The finish 12 further includes a support flange 50. The support flange 50 is configured to support the preform 10 against the blow mold 110 during the forming and filling process, as illustrated in FIG. 3. The support flange 50 includes an undersurface 52, which is opposite to an upper surface 54. The undersurface 52 includes an inner portion 56 and an outer portion 58. The inner portion 56 is inboard relative to the outer portion 58. Thus relative to an axial center of the finish 12 and the overall preform 10, through which a longitudinal axis A extends, the inner portion 56 is closer to the axial center than the outer portion 58.

The inner portion 56 is directly opposite to the brim 20, such that the inner surface 56 is linearly and vertically aligned with the brim 20. The outer portion 58 is vertically offset from the brim 20, and is thus outboard of the brim 20 relative to the axial center of the finish 12. The support flange 50 is an annular flange with the undersurface 52 having a larger radial area as compared to the upper surface 54. The undersurface 52 is radially longer than the upper surface 54.

Figure 2:
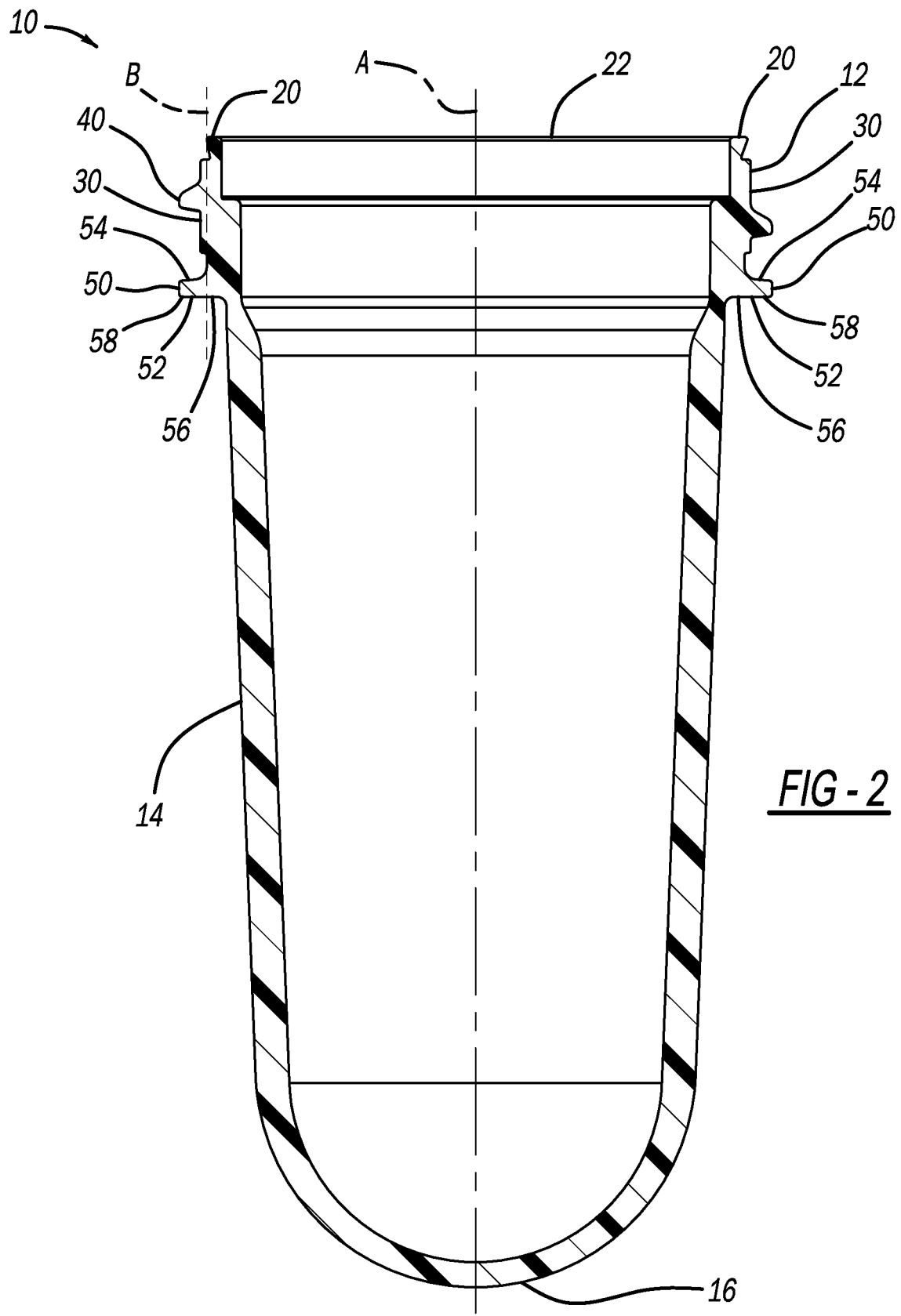
FIG. 2 is a cross-sectional view of the preform of FIG. 1.

FIGS. 2 and 3 include a linear line B extending parallel to the longitudinal axis A along an innermost portion of the outer surface 30. Line B is also aligned with an outermost portion of the brim 20. Thus line B extends along a minimum outer diameter of the finish 12. At a portion of the body 14 directly adjacent to the finish 12, the preform body 14 has a maximum outer diameter that is less than the minimum outer diameter of the finish 14 along which line B extends. Thus where the body 14 meets the finish 12, a maximum outer diameter of the body 14 is less than a minimum outer diameter of the finish 12.

As illustrated in FIG. 3, when the preform 10 is seated in the blow mold 110, such that the support flange 50 sits on an exterior surface of the blow mold 110, the blow mold 110 (and specifically a striker plate thereof) is aligned with the brim 20, and is directly opposite to the brim 20. This configuration reinforces the finish 12. Thus, when the filling and forming head seals against the brim 20 and applies force against the brim 20, the support flange 50 will not deform. This is in contrast to prior art preforms, such as the preform 10' of FIG. 4, which may experience deformation at the finish 12'.

Figure 4:
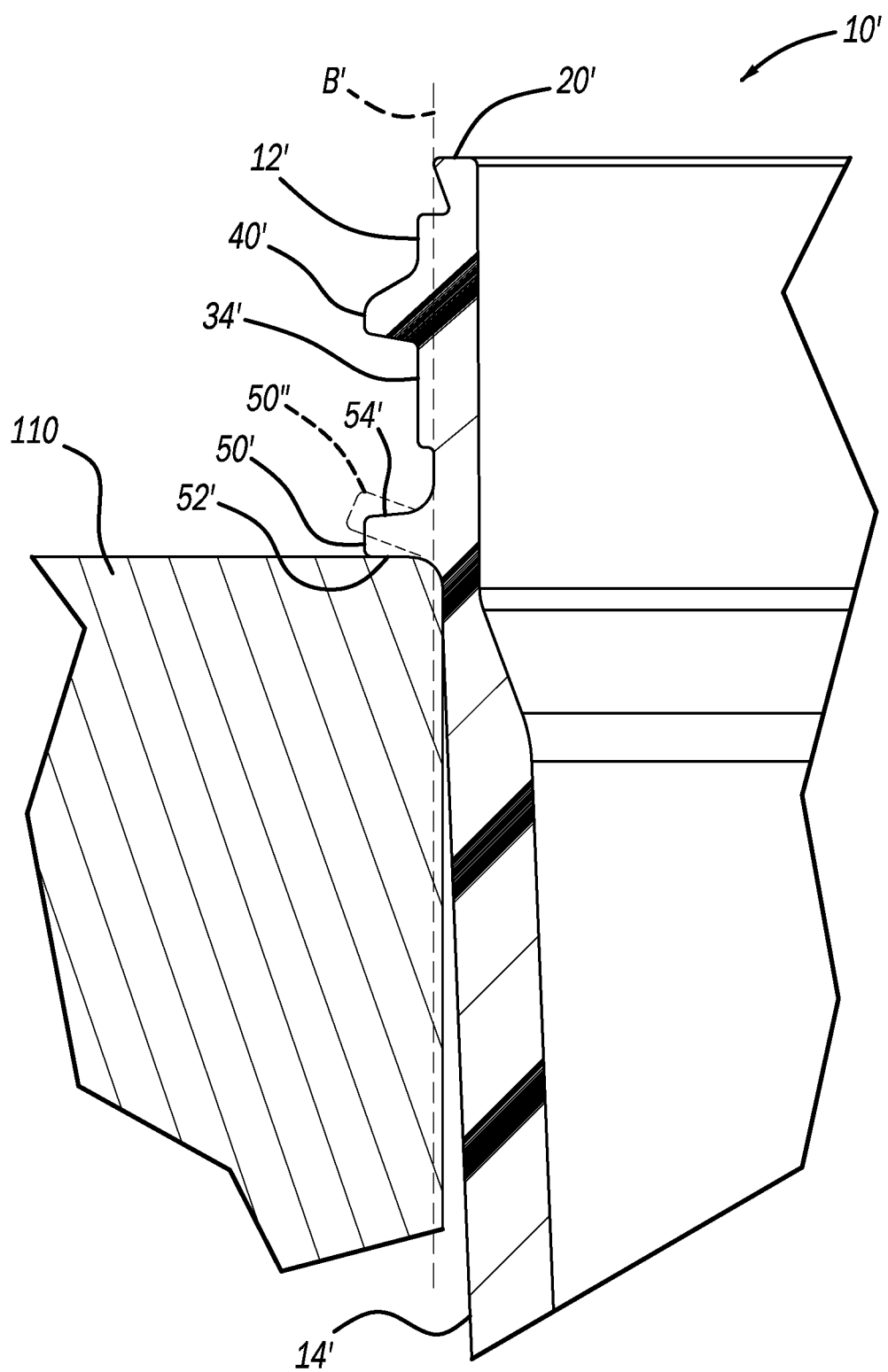
FIG. 4 is a cross-sectional view of interaction between a support flange of a prior art preform and a mold for forming a container from the prior art preform.

The prior art preform 10' is illustrated in prior art FIG. 4 with portions thereof that are similar to the preform 10 identified in FIG. 4 using the same reference numbers of the preform 10, but with the prime (') designation. Unlike the support flange 50 of the preform 10, no portion of the prior art support flange 50' is opposite to the brim 20'. The undersurface 52' and upper surface 54' of the support flange 50' have the same radial area and the same radial length. Furthermore, where the body 14' is adjacent to the finish 12', the body 14' has a maximum outer diameter that is the same as a minimum outer diameter of the finish 12'. With respect to line B', which extends parallel to a longitudinal axis of the preform 10', the minimum outer diameter of the finish outer surface 34' is aligned with the maximum outer diameter of the body 14' where the body 14' is adjacent to the finish 12'. Thus the prior art support flange 50 is not reinforced, and is subject to being deformed to position 50" when a forming and filling head applies pressure to the brim 20. The present disclosure thus advantageously eliminates, or greatly reduces, the possibility of the failure condition illustrated in prior art FIG. 4 by configuring the support flange 50 as described above.

Maintaining the support flange 50 intact advantageously allows for a consistent and lasting seal between the brim 20 and the forming/filling head, which advantageously results in the ability to hold pressure on the finish 12 during forming and increased definition in the formed container. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A finish of a preform and a container formed from the preform, the finish comprising:
   a brim defining an opening of the finish, the brim configured to provide a sealing surface with a forming and filling head for forming the container from the preform and filling the container with a product; and
   a support flange extending from an outer side surface of the finish, the support flange including an undersurface having an inner portion that is directly opposite to the brim;
   wherein the inner portion of the undersurface of the support flange is closer to an axial center of the finish than an innermost portion of the outer side surface, and the entire brim is radially aligned with and linearly over the inner portion of the support flange.

2. The finish of claim 1, further comprising threads at the outer side surface of the preform, the threads configured to cooperate with a closure for closing the opening of the finish.

3. The finish of claim 1, wherein the inner portion of the undersurface of the support flange is vertically inset relative to the innermost portion of the outer side surface.

4. The finish of claim 1, further comprising a preform body extending from the finish;
   wherein directly adjacent to the finish the preform body has a maximum outer diameter that is less than a minimum outer diameter of the finish.

5. The finish of claim 1, wherein the support flange further includes an upper surface opposite to the undersurface, the undersurface is longer radially than the upper surface.

6. The finish of claim 1, wherein the inner portion of the undersurface is inboard of an outer portion of the undersurface of the support flange relative to the axial center of the finish; and
   wherein the outer portion is outboard of the brim relative to the axial center of the finish.

7. The finish of claim 1, wherein the finish has a diameter of at least 48 mm.

8. The finish of claim 1, wherein the preform and the finish are formed of high-density polyethylene (HDPE) and the finish has a diameter of at least 48 mm.

9. The finish of claim 5, wherein the upper surface is linearly offset from the brim and outboard of the brim relative to the axial center of the finish.

10. A finish of a preform and a container formed from the preform, the finish comprising:
    a brim defining an opening of the finish, the brim configured to provide a sealing surface with a forming and filling head for forming the container from the preform and filling the container with a product; and
    a support flange extending from an outer side surface of the preform, the support flange including an undersurface and an upper surface opposite to the under surface, the undersurface has a larger radial area than the upper surface, and the entire brim is located directly over and opposite of the inner portion of the support flange.

11. The finish of claim 10, wherein the undersurface is radially longer than the upper surface.

12. The finish of claim 10, wherein an outer portion of the undersurface is laterally offset from the brim.

13. The finish of claim 10, wherein the finish has a diameter of at least 48 mm.

14. The finish of claim 10, wherein the finish has a diameter of 48 mm.

15. The finish of claim 10, wherein the preform and the finish are formed of high-density polyethylene (HDPE) and the finish has a diameter of at least 48 mm.

16. The finish of claim 12, wherein the inner portion of the undersurface is opposite to a body of the finish.

17. The finish of claim 12, further comprising a preform body extending from the finish;
    wherein directly adjacent to the finish the preform body has a maximum outer diameter that is less than a minimum outer diameter of the finish.

* * * * *